United States Patent Office 3,167,767
Patented Jan. 26, 1965

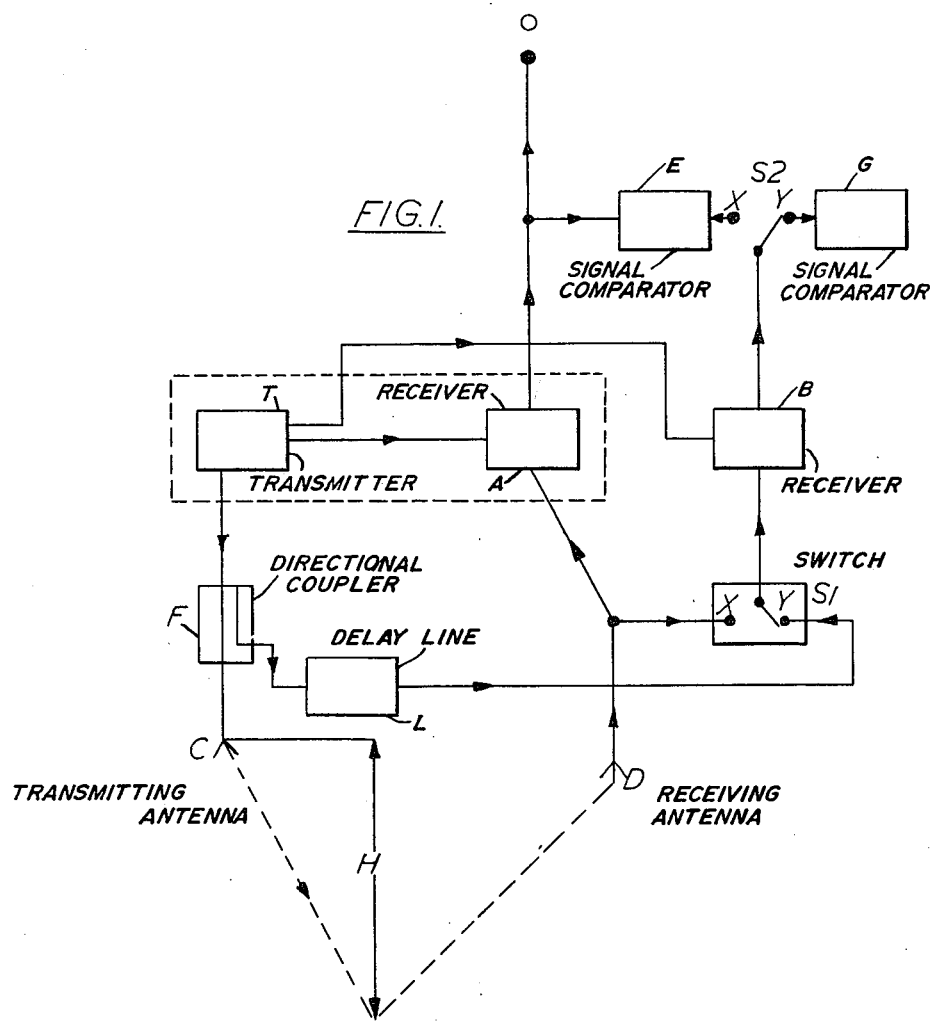

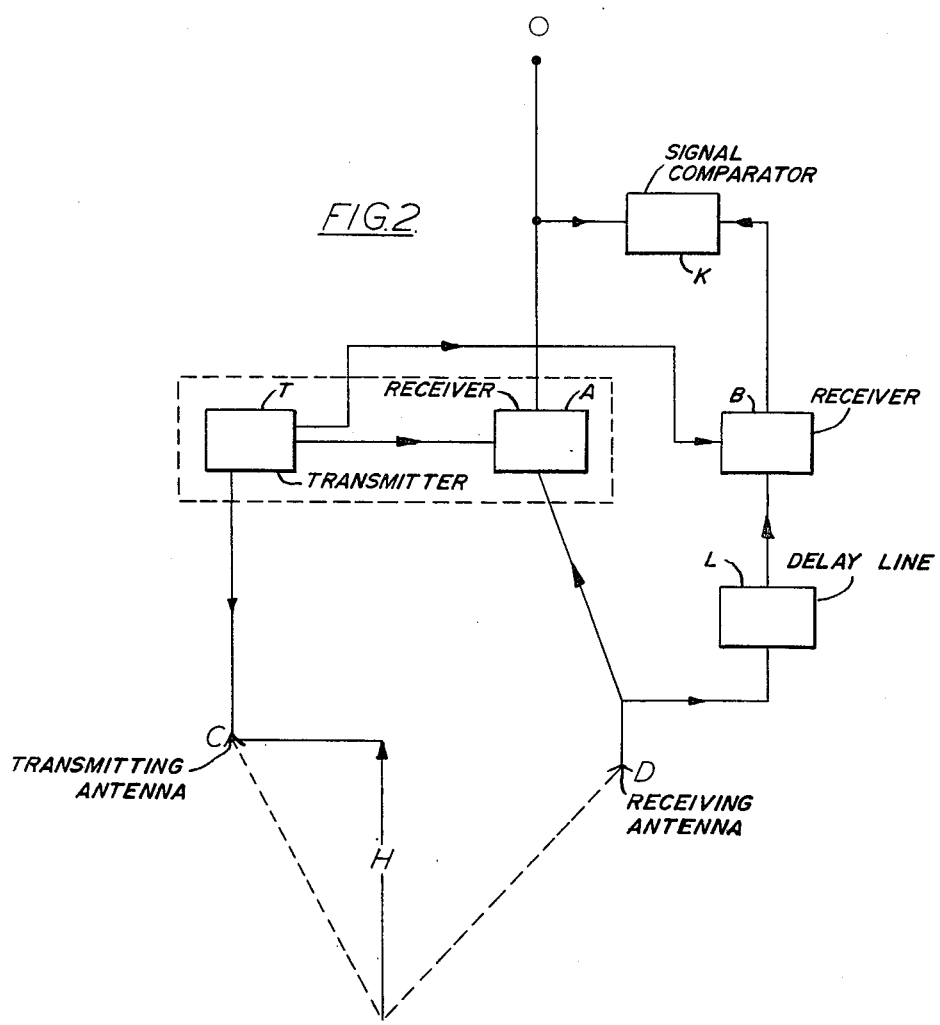

3,167,767
RADIO ALTIMETERS
Marino Pompeo Giovanni Capelli, London, England, assignor to International Standard Electric Corporation, New York, N.Y., a corporation of Delaware
Filed Sept. 15, 1961, Ser. No. 138,510
Claims priority, application Great Britain, Sept. 20, 1960, 32,219/60
4 Claims. (Cl. 343—14)

This invention relates to radio altimeters such as are used in aircraft, of the type in which an altitude indication is determined by the beat frequency between a frequency modulated transmitted wave and its contemporaneously received echo wave reflected from the ground.

The invention provides an arrangement whereby a continuous calibration check on the altimeter is maintained, without interrupting the flow of height readings provided by the altimeter. This is accomplished by the use, with the altimeter, of a radio frequency delay line of known delay time, a signal receiver comprising a signal amplifier and associated transfer circuits which yield an output proportional to the height of the altimeter, and signal comparing means.

The altimeter receiver is checked by comparison of the height indicating signals produced when the signal from the receiving antenna is passed along its normal path through the altimeter receiver, and along another path through an alternative receiver. The correct functioning of the altimeter transmitter, and of the alternative receiver, is checked by passing a signal from the altimeter transmitter through a delay line of known time delay and then to the alternative receiver, via a suitable path.

The nature of the invention will be better understood from the following description of two specific embodiments, and by reference to the accompanying drawings, in which:

FIG. 1 represents a schematic diagram of the first embodiment.

FIG. 2 represents a schematic diagram of the second embodiment.

Referring to the first embodiment, as shown in FIG. 1: reference letters T and A refer to the altimeter transmitter and receiver respectively, F is a directional coupling device, and C and D indicate the transmitting and receiving antennae, between which a signal passes by reflection from the ground situated at distance H beneath the altimeter. The letter O represents the height indicating output of altimeter receiver A. The general functioning of the altimeter is as described, for instance, in U.S. Patent No. 2,686,302.

The further components, which enable a continuous calibration check to be maintained, include the delay line L of known delay time, the receiver B, switches $S_1$ and $S_2$, and signal comparing means E and G.

In addition to the normal connections from the transmitter T to the altimeter receiver A, and to the transmitting antenna C via the directional coupling device F, connections are provided to apply the transmitter signal both to the point Y of switch $S_1$ via the directional coupling device F and the delay line L, and also directly to the receiver B. Receiver B is also connected to both switches $S_1$ and $S_2$. In addition to the normal connection between the receiving antenna D and the altimeter receiver A, connection is provided between the receiving antenna D and the point X of switch $S_1$. The two signal comparing means E and G are connected to points X and Y respectively of switch $S_2$, and signal comparing means E is also connected to the height indicating output of the altimeter receiver A.

The switches $S_1$ and $S_2$ are switched automatically at a convenient frequency, in such manner that at any given time either both switches are in the position X or both switches are in the position Y.

When $S_1$ and $S_2$ are in position Y, the receiver B receives signals from the transmitter both directly and via the directional coupling device F and the delay line L. These signals are mixed in the receiver to provide a receiver output reading corresponding to a height above the earth for which the sum of the go and return free space propagation times between the antennae and the earth's surface is equal to the delay time of the delay line L, as described, with reference to a normal altimeter receiver, in U.S. Patent No. 2,686,302. For convenience, this height reading will be referred to as the "calibration height reading" throughout the remainder of this specification.

The output of receiver B passes to the signal comparing means G, in which it is compared with a predetermined voltage or current arranged to correspond to the calibration height reading when allowance is made for the known parameters of the correctly functioning altimeter. Agreement of the two signals compared by signal comparing means G therefore establishes that the transmitter T of the altimeter, and the receiver B, are working correctly, since they together produce a correct reading corresponding to the known electrical properties of the delay line L. Signal comparing means G is arranged to operate an alarm in the event of disagreement between the two compared currents or voltages.

When the switches $S_1$ and $S_2$ are in the position X the altimeter receiver A and the receiver B are connected in parallel between the receiving antenna D and the signal comparing means E. Correct functioning of the altimeter receiver A is indicated by equality of its height indicating output signal with that of the previously checked receiver B. Signal comparing means E is arranged to operate an alarm in the event of disagreement between the two compared signals.

The second embodiments of the invention, as shown in FIG. 2, will now be described.

In addition to the normal connection to the altimeter receiver A, the receiving antenna D is also connected to the receiver B via a delay line L of known electrical properties. In addition to the normal connections to the altimeter receiver A, the altimeter transmitter T is connected to the receiver B. The height indicating output of altimeter receiver A, and the output of receiver B, are connected to signal comparing means K. The height indicating output of receiver A is represented at O. H indicates the vertical measure of the propagation path from the transmitting antenna C to the earth's surface and thence by reflection to the receiving antenna D.

The receivers A and B are connected in parallel between the receiving antenna D and the signal comparing means K, so that the received signal is shared between them. Relative to receiver A, the signal to and output from receiver B is delayed by a time which is determined by the electrical properties of the delay line L. The signal comparing means K is arranged to operate an alarm if the signals from receivers A and B do not differ by the known time.

In both the described embodiments, a sharing between two receivers of the signal received by the receiving antenna D is involved. This necessarily leads to some reduction in the maximum altimeter range as compared with a similar altimeter without the continuous calibration feature. For example, if in the first embodiment the receiving antenna power is divided equally between the two receivers, the maximum range is about 70% that of the simple altimeter. However, if it is sufficient to introduce the continuous calibrations feature only for heights in the range 0 to 25% of the simple altimeter range, the range of the altimeter provided with the continuous calibration feature is increased to 90% that of the simple altimeter. The restriction of range is more severe in the case of the second embodiment, due to the attenuation produced by the delay line L. In all cases it is necessary to ensure that the signal strength at the receiving antenna is sufficient to allow operation up to the required maximum range.

What we claim is:

1. A frequency modulated radio altimeter comprising a transmitter a first receiver, a second receiver, a first signal path between the transmitter and the second receiver, a second signal path between the transmitter and the second receiver, a delay line connected in the second signal path, a third signal path between the transmitter and the first receiver, a transmitter antenna connected to the transmitter and a receiver antenna connected to the first receiver to provide a further signal path between the transmitter and the first receiver, and means for comparing the frequency of an output signal from each of the receivers.

2. An altimeter as claimed in claim 1 in which a part of the second signal path is provided by the signal path between the transmitter antenna and the receiver antenna.

3. A frequency modulated radio altimeter comprising a transmitter, first and second receivers, means coupling the output of said transmitter to said first and second receivers, a transmitting antenna, a delay line, a directional coupler coupling said transmitter to said delay line and said transmitting antenna, a receiving antenna, means coupling said receiving antenna to said first receiver, switching means coupling said receiving antenna and the output of said delay line alternately to said second receiver, first and second signal comparators, means coupling the output of said first receiver to height indicating means and to said first comparator, and switching means alternately coupling the output of said second receiver to said first signal comparator and said second signal comparator.

4. A frequency modulated radio altimeter comprising a transmitter, first and second receivers, a transmitting antenna coupled to said transmitter, means coupling the output of said transmitter to said first and second receivers, a delay line, a receiving antenna, means coupling said receiving antenna to said first receiver and to said delay line, means coupling the output of said delay line to said second receiver, a signal comparator, a height indicating means, means coupling the outputs of said first and second receivers to said comparator means and means coupling the output of said first receiver to said height indicating means.

No references cited.